Patented Aug. 29, 1933 1,924,350

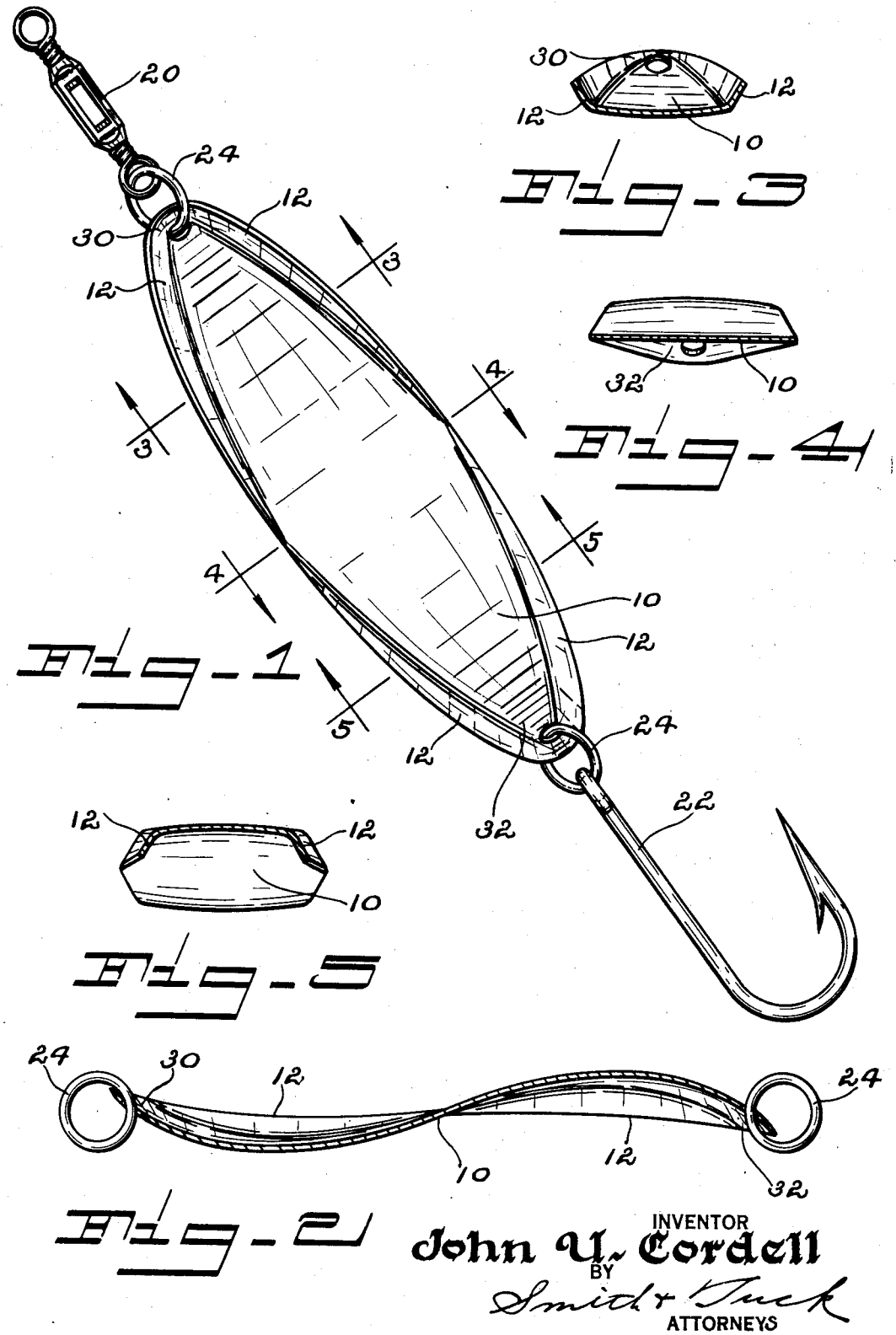

UNITED STATES PATENT OFFICE 1,924,350

TROLLING LURE

John U. Cordell, Renton, Wash.

Application September 16, 1930
Serial No. 482,224

4 Claims. (Cl. 43—42)

My present invention relates to the art of fishing spoons and more particularly to a trolling lure.

My trolling lure or spoon is of that general class commonly referred to as a single piece non-revolving type. This art is well expressed in such patents as 1,136,475. My spoon, however, has a very decided shape in which it differs from the above named patent and resembles more closely in general contour Patent No. 728,360. There are, however, certain marked improvements in my construction over either of the above named patents, particularly the latter.

I have found that for a spoon to be commercially successful it must be so designed that it will catch fish under widely varying conditions of use. In the first place my spoon is arranged so that it swims somewhat like Patent 1,136,475. In other words, my spoon when towed through the water will normally ride on its edge. This may seem unusual but I have found that where the impinging of the water in the front part of the spoon is counteracted by a reverse impingement at the rear of the spoon, that there is no force sufficient to make the spoon revolve. Then as the spoon is towed through the water it immediately assumes a position wherein the body of the spoon tends to ride in a vertical plane. This is the result of a natural tendency of the spoon to pursue the line of least resistance in the water. In other words, if this spoon were to travel with its greater surfaces horizontal the frictional resistance would be a multiple of the thickness of the spoon and since the weight of the sinker increases the pressure of the water on the under side of the spoon and thereby increases the frictional resistance the spoon at once turns on its edge and thereby cuts the frictional resistance to a minimum.

My spoon is formed sufficiently different from Patent No. 728,360 so that it will maintain its swimming action through a wide variety of speeds—from speeds as low as one mile an hour up to speeds of five miles per hour. This is a great advantage, particularly to the inexperienced fisherman or one who may be using motor equipment that will not permit him to go at the speed he knows most desirable. Therefore:

The principal object of my invention is to provide a trolling lure which presents the illusion of a swimming fish.

A further object is to provide a swimming lure which, because of its novel shape, will swim through a range of speeds not before deemed possible.

A further object is to provide a lure so shaped as to create a slightly snaking movement as it is drawn through the water.

A still further object is to provide a fishing lure which has reverse curves thereon so disposed that they will reflect rays of light in all directions and present the appearance of a rapidly moving fish.

A final object is to provide a spoon whose body is formed with curved surfaces and with a marginal rim which gives unusual strength to the spoon and also causes the spoon to oscillate about its longitudinal axis so that light-reflections may be directed in all directions.

Other and more specific objects will be apparent from the following description taken in connection with the accompanying drawing, wherein:

Figure 1 is a plan view showing my spoon with the usual swivel and hook attached thereto.

Figure 2 is a longitudinal sectional view with the hook and swivel removed.

Figure 3 is a cross-sectional view along the line 3—3 of Figure 1.

Figure 4 is a cross-sectional view along the line 4—4 of Figure 1.

Figure 5 is a cross-sectional view along the line 5—5 of Figure 1.

Referring to the drawing throughout which like reference characters indicate like parts, numeral 10 designates the main body of my lure, which, when projected or viewed in plan view has the general shape of an elongated ellipse. Taking the section line 4—4 in Figure 1 as a transverse axis each end therefrom is identical in form except that one is reversed from the other. This is more clearly brought out in Figure 2 which shows clearly the reverse curves along the longitudinal axis. This general form is shown in Patent No. 728,360.

When the spoon is made along the line of the patent indicated it has been found to be very critical as to trolling speed and as so many conditions, oftentimes beyond the control of the fisherman, regulates the trolling speed, I have provided means which tend to stabilize this spoon and thus make it a more practical device. This consists of forming sharp lips 12 around each end of the spoon. This will be more clearly observed by viewing Figures 3 and 5. It will be observed that the portions actually sectioned are identical except that they are reversed, one pointing upwardly and the other pointing downwardly. These lips, of course, have their maximum depth near each end and run out entirely at the transverse axis which is shown as a straight line in Figure 4.

Inasmuch as the two ends of my spoon are formed identical the impinging action of the water on the two edges seem to counteract each other, but have a further peculiar property of so stabilizing my spoon that its actions are quite normal through a wide range of speed changes and it is this very desirable and important feature that I feel is the principal point of novelty in my construction.

Method of operation

When it is desired to use my spoon a swivel 20 is secured to one end and a suitable hook 22 secured to the opposite end as by rings 24. As my spoon is symmetrical either end may be taken as the front end. When the spoon is placed in the water my spoon should be secured to the main trolling line by a length of lighter line, preferably leader which may be of the so-called raw silk type or more preferably light wire. Several feet of this should be provided as without the same, the lead weights, used to sink the spoon to the proper depths, interfere with the free operation of the spoon. When the spoon is towed through the water under these conditions I have found that there is a slight side to side movement, due to the reverse curves of the spoon. The most pronounced movement, however, which may be considered as superimposed upon the other, is for the swivel end 30 to remain more or less stationary with respect to the line of draft and for the rear end 32 to oscillate from side to side. This creates the illusion of a fish swimming and the gradual snaking movement further imitates the swimming fish which rarely swims in a perfectly straight line. There is still a third movement present in my spoon. This I have found is controlled largely by the formation of the lips 12 and that is a rocking of my spoon about its longitudinal axis. The spoon does not actually revolve but oscillates from side to side and in this respect differs substantially from Patent No. 1,136,475. This action is very desirable as it enables the numerous curved surfaces of the spoon to send off their reflected rays of light in all directions and thus make it possible for a fish at a lower or higher depth than the spoon, to see the same. This action is not true of spoon 1,136,475, which swims very nicely but on a very even keel so that light is not reflected upwardly or downwardly, as is true with my present spoon.

The foregoing description and the accompanying drawing are believed to clearly disclose a preferred embodiment of my invention but it will be understood that this disclosure is merely illustrative and that such changes in the invention may be made as are fairly within the scope and spirit of the following claims.

What I claim is:

1. A trolling lure having an elliptical marginal contour; and two spoon shaped, reversely set, ends, each of which has a sharply turned lip formed as a continuation of the spoon shaped portions; the lips on the opposite ends of the spoon being of equal extent and degree; said lips being deepest near the extreme ends of the spoon and terminating at the transverse axis of the spoon.

2. An elliptical trolling lure formed of a single piece of metal of essentially an ogee form, each end being similar, reversely set and dished in a direction at right angles to the line of said ogee and having sharply turned lips formed as a prolongation of the dished portion; the lips on the opposite ends of the spoon being of equal extent and degree; said lips being deepest near the extreme ends of the spoon and terminating at the transverse axis of the spoon.

3. A trolling lure having an elliptical marginal contour; two identical spoon shaped, reversely set, ends, each of which has a sharply turned marginal lip formed as a continuation of the spoon shaped portions; a curved portion joining the lips and the spoon shaped portions; a swivel attaching opening at one end; a hook attaching opening at the opposite end; a flat section at the transverse axis of the spoon; both of said attaching openings and the transverse section forming a straight line.

4. An elliptical trolling lure formed of a single piece of metal of essentially an ogee form, each end being of identical construction, dished in a direction at right angles to the line of said ogee and having a sharply turned marginal lip formed as a prolongation of the dished portion; a swivel attaching opening at one end; a hook attaching opening at the opposite end; a flat section at the transverse axis of the spoon; both of said attaching openings and the transverse section forming a straight line.

JOHN U. CORDELL.